United States Patent
Somerville

(10) Patent No.: US 8,768,901 B1
(45) Date of Patent: Jul. 1, 2014

(54) METHOD AND APPARATUS FOR SELECTIVELY STORING BLOCKS OF DATA ON A SERVER

(75) Inventor: Robert Somerville, San Luis Obispo, CA (US)

(73) Assignee: Symantec Operating Corporation, Mountain View, CA (US)

(*) Notice: Subject to any disclaimer, the term of this patent is extended or adjusted under 35 U.S.C. 154(b) by 0 days.

(21) Appl. No.: 13/461,183

(22) Filed: May 1, 2012

Related U.S. Application Data

(63) Continuation of application No. 10/867,611, filed on Jun. 14, 2004, now Pat. No. 8,176,015.

(51) Int. Cl.
| | |
|---|---|
| *G06F 17/00* | (2006.01) |
| *G06F 11/14* | (2006.01) |
| *G06F 21/56* | (2013.01) |
| *G06F 17/30* | (2006.01) |
| *G06F 11/20* | (2006.01) |

(52) U.S. Cl.
CPC .......... *G06F 11/1451* (2013.01); *G06F 21/565* (2013.01); *G06F 17/30* (2013.01); *G06F 11/2094* (2013.01)
USPC ........... 707/697; 707/616; 707/641; 707/661; 707/690; 707/692; 714/52

(58) Field of Classification Search
CPC ... G06F 11/1451; G06F 21/565; G06F 17/30; G06F 11/2094
USPC ................. 707/616, 641, 661, 690, 692, 697; 714/52
See application file for complete search history.

(56) References Cited

U.S. PATENT DOCUMENTS

| | | | |
|---|---|---|---|
| 4,720,830 A * | 1/1988 | Joshi et al. | 714/775 |
| 5,146,324 A * | 9/1992 | Miller et al. | 375/240.03 |
| 5,155,484 A * | 10/1992 | Chambers, IV | 341/55 |
| 5,579,283 A * | 11/1996 | Owens et al. | 367/83 |
| 5,778,253 A * | 7/1998 | Blair et al. | 710/68 |
| 5,930,399 A * | 7/1999 | Kadyk et al. | 382/245 |
| 5,974,574 A * | 10/1999 | Lennie et al. | 714/52 |
| 6,219,818 B1 * | 4/2001 | Freivald et al. | 714/799 |
| 6,748,381 B1 * | 6/2004 | Chao et al. | 1/1 |
| 2002/0169934 A1 * | 11/2002 | Krapp et al. | 711/159 |
| 2005/0080823 A1 * | 4/2005 | Collins | 707/200 |
| 2005/0223268 A1 * | 10/2005 | Tchen et al. | 714/6 |

* cited by examiner

*Primary Examiner* — Cheyne D Ly
(74) *Attorney, Agent, or Firm* — Campbell Stephenson LLP

(57) ABSTRACT

A method and apparatus for selectively storing data on a server. The method operates by accessing a computer file and defining a data block as a current block of data. The current block is subsequently checksummed using a rolling error identification code. The method then determines if the calculated checksum for the current block has been previously stored in a database. If a matching checksum for the data is found in the database, then a duplicate of the current block already exists and the process repeats by selecting a new block of data. Alternatively, if the calculated checksum is absent from the checksum and the process has advanced one block length, the process moves back one block length and stores the current block in an archive. Otherwise, the checksum advances one byte forward to form a new current block of data and the process repeats.

20 Claims, 2 Drawing Sheets

METHOD AND APPARATUS FOR SELECTIVELY STORING BLOCKS OF DATA ON A SERVER

CROSS-REFERENCE TO RELATED APPLICATIONS

This application is a continuation of U.S. patent application Ser. No. 10/867,611, entitled "METHOD AND APPARATUS FOR REDUCING REDUNDANT STORING OF BLOCKS OF DATA ON A SERVER", filed Jun. 14, 2004 now U.S. Pat. No. 8,176,015, naming Robert Somerville as inventor. This application is assigned to Symantec Operating Corporation, the assignee of the present invention, and is hereby incorporated by reference, in its entirety and for all purposes.

BACKGROUND OF THE INVENTION

1. Field of the Invention

Embodiments of the present invention generally relate to data storage systems, and more particularly, to a method for selectively storing blocks of data on a server.

2. Description of the Related Art

Modern computer networks generally comprise a plurality of user computers connected to one another and to a computer server via a communications network. To provide redundancy and high availability of information and applications that are executed upon a computer server, multiple computer servers may be arranged in a cluster, i.e., forming a server cluster. Such server clusters are available under the trademark VERITAS CLUSTER SERVER from Veritas Software Corporation of Mountain View, Calif. In a server cluster, a plurality of servers communicate with one another to facilitate failover redundancy such that when software or hardware, i.e., computer resources, become inoperative on one server, another server can quickly execute the same software that was running on the inoperative server substantially without interruption. As such, a user of services that are supported by a server cluster would not be substantially impacted by an inoperative server or software. To facilitate high availability and redundancy, the server cluster contains backup servers for redundantly storing data from the various servers within a server cluster. Backup servers are also employed in non-clustered environments to mitigate against the risk of hardware and software failure. Fast, efficient, low impact, cost effective backup of file and application servers is critical in many business environments.

In the interest of optimizing the amount of disk space utilized by backup servers, software applications have been developed that attempt to eliminate duplicate files as a backup of the files is being performed. Most of these applications calculate a signature, or identification number, for a given file that is to be backed up. This signature is then compared with other identification numbers, which are associated with files previously stored as a backup file, in an attempt to locate a match. If a duplicate is not located, the entire file is saved on the backup server and the corresponding signature is added to the signature database. If a duplicate signature is found, the file is then ignored and will not be stored on the backup server (since an exact copy already exists). By eliminating the identified extraneous data, these computer programs can reduce the amount of disk space used by the backup server to store files.

More specifically, a system for eliminating duplicate data on the block (i.e., sub-file) level can be used to reduce storage space even further than a file based system. This system operates by initially receiving a data block of predefined size and then subsequently calculating a signature for the block. The system then accesses a signature database on the backup server and initiates a search for a matching signature. This procedure is repeated for every block in the file to be stored. This is particularly effective when two copies of the same file are being archived. This system is not as effective when storing a copy of a file, and a slightly modified version of the copy. The reason is that an insertion anywhere inside the modified version will cause a misalignment of all of the signature blocks that follow the insertion. For example, a one Gigabyte file is stored on a server. A copy of the one Gigabyte file is made, and one byte is inserted at the beginning of the file. None of the blocks in the modified version of the file will match with the blocks stored on the server. The entire modified file must be archived, even though it is almost identical to the original. This would also be true if one byte were deleted from the front of the file.

Therefore, there is a need in the art for a more efficient method of eliminating redundant data in backup servers.

SUMMARY OF THE INVENTION

The invention provides a method for selectively storing duplicate blocks of data on a server at sub-file increments. Specifically, this invention operates by first accessing a computer file (e.g., an image file containing various files to be stored as an archive on a backup server) and then reading data blocks of predefined size. Each block that is read is subsequently checksummed using a rolling error identification code (e.g., a cyclic redundancy check). The calculated checksum for each block is then compared with a list (e.g., a database) to determine if the block of data has been previously stored in the backup server.

If a matching checksum for the block of data is found on the database, a verification value (e.g., a signature) for the current block is calculated. If the verification value is also found in the database, then the process has determined that a replica of the block of data already exists in the archive. This block of data from the original image file is then ignored and a new block of data is subsequently selected and processed.

Alternatively, if the calculated checksum is absent from the database, the checksum is then rolled forward. More specifically, the last byte of the current block is dropped and a new byte is added to the front of the block, thereby creating a new current block. The entire process is then repeated and continues until a checksum match is found or until a "block" (i.e., a predefined number of bytes) worth of data has been processed. Once an entire block of data has been processed without a checksum match, the data is stored in the archive and the data block's checksum and verification value are each respectively calculated and added to the database. If a partial block (sub-block) has been processed and a checksum match is found, a checksum and a verification value are created for the partial block. The partial block as well as its checksum and verification value are stored in the archive.

BRIEF DESCRIPTION OF THE DRAWINGS

The following detailed description makes reference to the accompanying drawings which are now briefly described.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
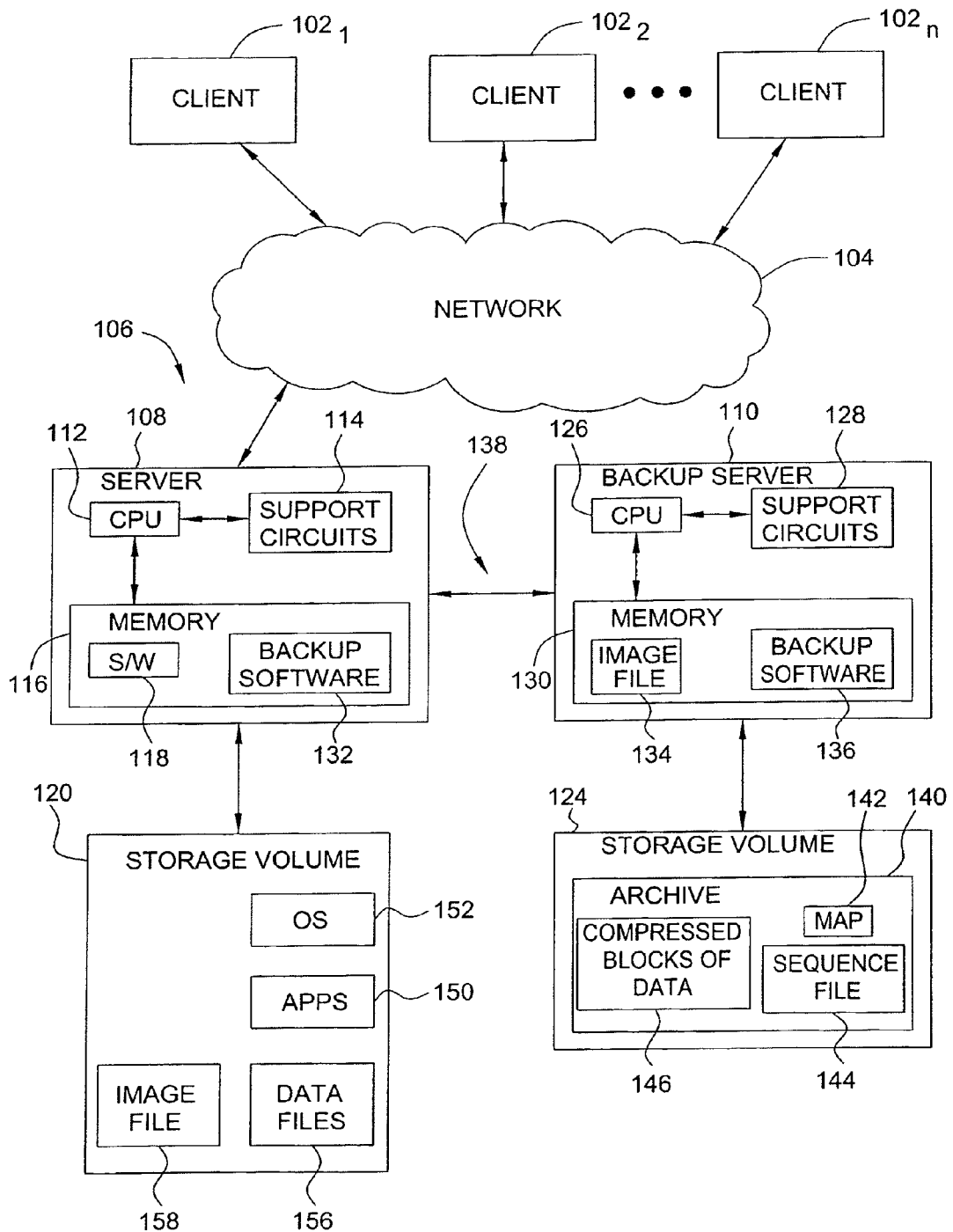
FIG. 1 is a block diagram of a computer network having a server cluster that operates in accordance with the present invention.

FIG. 1 depicts a computer network 100 in which one embodiment of the present invention may be utilized. The invention, as shall be discussed below, is a method for selectively storing data within a backup server.

The computer network 100 comprises a plurality of client computers $102_1, 102_2 \ldots 102_n$ that are connected to a network 104. The client computers 102 may contain one or more individual computers, wireless devices, personal digital assistants, desktop computers, laptop computers or any other digital device that may benefit from connection to a computer network.

The computer network 104 is a conventional computer network which may be an Ethernet network, a fiber channel network, and the like. The client computers 102 may be connected to a server cluster 106 through a firewall, a router, or some form of switch (not shown). The server cluster 106 generally comprises multiple servers 108 and 110 (for simplicity, only two servers are shown) that are interconnected to one another by a server cluster network 138. Although the servers within the server cluster 106 may be identical, one of the servers will be operating to service particular clients (users) at any particular time. This server is identified as the production server 108 while server 110 is deemed a backup server vis-à-vis the production server 108. Both of the servers 108, 110 may be referred to as nodes of the server cluster 106. Although one server cluster 106 is depicted in FIG. 1, those skilled in the art will realize that many server clusters benefiting from the invention can be connected to the computer network 104. Such a server cluster 106 may be a VERITAS CLUSTER SERVER available from Veritas Software Corporation of Mountain View, Calif.

The production server 108 generally includes at least one central processing unit (CPU) 112, support circuits 114 and memory 116. The CPU 112 may include one or more commercially available processors. The support circuits 114 are well known circuits that include cache, power supplies, clocks, input/output interface circuitry, and the like.

The memory 116 may include random access memory, read only memory, removable disk memory, flash memory, and various combinations of these types of memory. The memory 116 is sometimes referred to as main memory and may in part be used as cache memory. Similarly, the memory 116 stores various applications such as application software 118 and backup software 132. The server 108 is also coupled to a storage volume 120 that holds the application software 150, operating system software 152, the original image file 158, and data files 156 that are executed and used by the server 108.

Each backup server 110 comprises a CPU 126, support circuits 128, and memory 130. The memory in the backup server 110 contains backup software 136. During a backup process, the server 108 creates the image file 158 (e.g., a snapshot of the contents of all or a portion of the storage volume 120) that consolidates the replicas of the application software 150, operating system software 152, and data files 156 in one single file. This image file 158 is sent to the backup server 110 for archival purposes. The original image file 158 is temporarily stored as image file 134 in memory 130 of the backup server 110 while it is processed for non-redundant storage in accordance with the invention.

The backup server 110 is also coupled to a storage volume 124, which contains an archive 140 for all the backed up image files. This archive 140 contains a database such as an archive map 142, a sequence file 144, and blocks of data 146 (e.g., blocks from image files). The archive map 142 is a database that is responsible for maintaining a list of blocks contained in the archive 140 and for tracking where in the archive 140 the data blocks are stored. The archive map 142 also maintains a reference count of used data blocks (i.e., an indicator of the number of stored data blocks that possessed redundant matches from the production server's image file 158). Similarly, a sequence file 144 is also present in the storage volume 124. The sequence file 144 stores the file orientation information that will be used to recreate the original image file or files from the backup form. The sequence file 144 contains a list of blocks that can be used to reconstruct each file held in the archive. Alternatively, the information kept in the sequence file could be stored in a database. The sequence file also contains the full name of each file held in the archive. When a file needs to be read from the archive a lookup by name into the sequence file is performed. The lookup will return an ordered list of blocks used to reconstruct the original file. Using this ordered list, the blocks can be read and the original file reconstructed from the archive.

To facilitate communications within the server cluster, the backup server 110 and the production server 108 are interconnected by, for example, a private network 138. Alternatively, a public network may be used.

Figure 2:
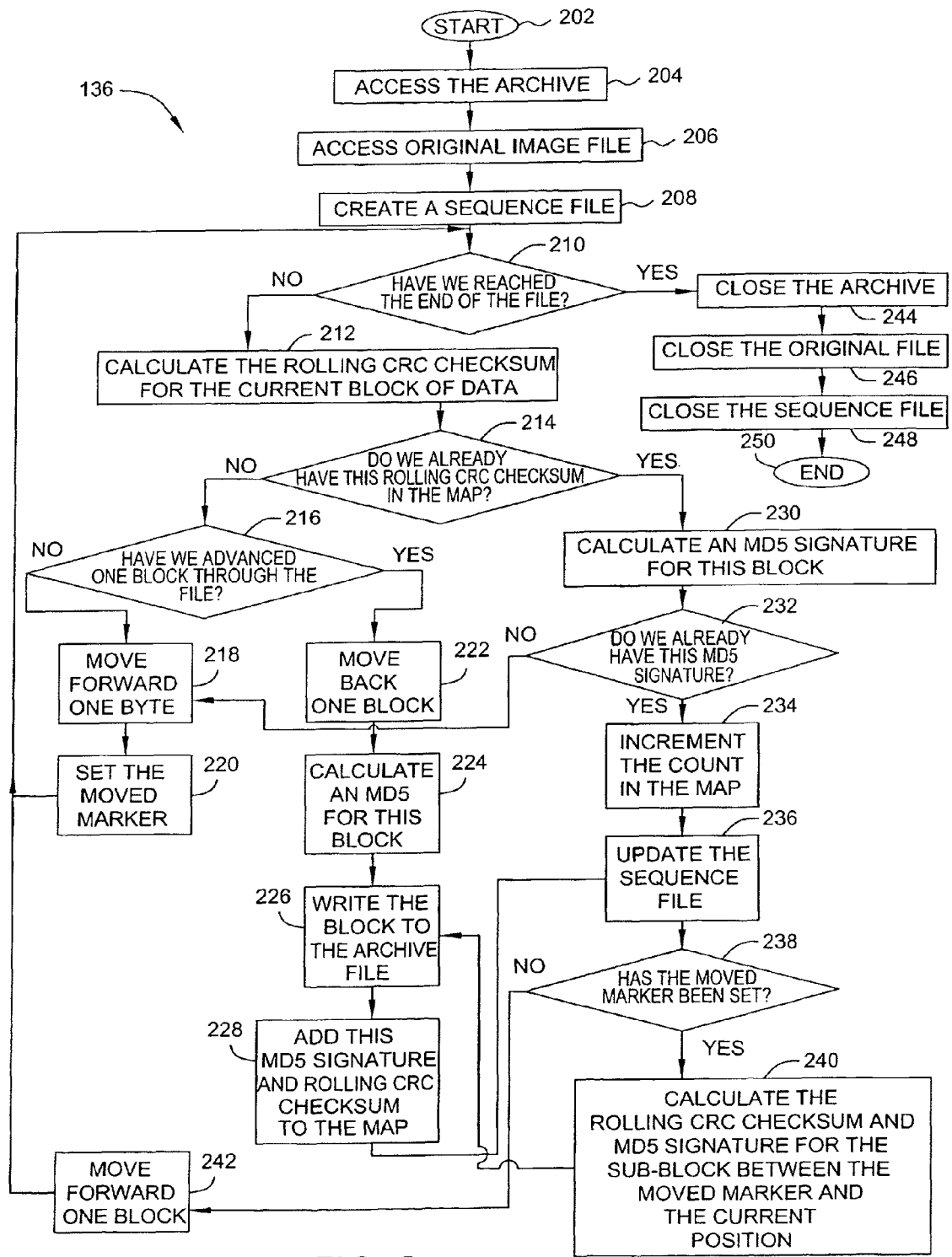
FIG. 2 depicts a flow diagram of a method of identifying and eliminating redundant data in accordance with the present invention.

FIG. 2 depicts a flow diagram of a method 200 executed by the backup software 136 contained in the backup server's memory 130. The method 200 commences at step 202 and proceeds to step 204, where the archive 140 of the backup server's storage volume 124 is made accessible. The method 200 continues to step 206 where an original image file 158 is accessed from memory 130. This original image file 158 will eventually be copied (either in its entirety or merely a portion) into the archive 140 if it is not already stored as compressed data 146. At step 208, a sequence file 144 is created for the aforementioned original image file 148. The sequence file 144 contains the file orientation needed to recreate the original image file 158 as well as providing the location of the original image file's data once it is stored in the archive 140. Continuing to step 210, the method 200 determines whether the end of the file 158 has been reached. If this is the case, then the method 200 proceeds to steps 244, 246, 248, and 250 where the archive 140, original image file 158, and sequence file 144 are closed and the method 200 ends. Otherwise, the process advances to step 212 where the method 200 selects a data block of predefined size and uses a rolling error identification code to calculate a checksum for this current block of data. An example of a rolling error identification code would include a 32-bit rolling cyclic redundancy check (CRC).

Once the checksum is calculated, the method 200 determines, at step 214, if the checksum has already been stored in a database, e.g., the archive map 142. The archive map 142 contains a list of CRC checksums (and MD5 signatures) for the blocks of data stored in the archive 140. If the calculated checksum matches a value on the archive map 142, thus indicating that the current block of data potentially exists in the archive 140, the method continues to step 230. If the CRC checksum is not found in the map, then the method 200 continues to step 216.

At step 216, a determination is made whether the method 200 has processed one block (i.e., a predefined number of bytes) of data of the original image file 158. If an entire block's worth of data has not yet been checked, the method continues to step 218 where the checksum is rolled over and the current block advances one byte. Specifically, the method 200 drops off the last byte from the current block and adds a new byte to the front of the block, thereby creating a new current block. This rolling CRC checksum feature enables the invention to conduct an aggressive search for duplicate and redundant data. At step 220 a place marker is appropriately set to designate the position of the beginning of the new current block and the process returns to step 210.

If the method 200 determines that a block's worth of data of the original image file 158 has been processed at step 216, then the process continues to step 222 where the place marker is moved back one entire block length. This "backtracked" block represents a unique block of data which has yet to be stored in the backup server's archive 140. The process then continues to step 224 where a verification value is calculated for this unique block of data. In the context of this invention, a verification value can be, but is not limited to, a signature calculated by a MD5 algorithm. A MD5 algorithm is a specific type of message digest function that receives a data block of arbitrary length and produces a 128-bit signature as output. Due to the number of bits contained in the signature, it is practically impossible for the MD5 algorithm to designate two data blocks with the same signature. Other verification values may be used, including MD4 and SHA-1. At step 226, the unique block of data is stored to the archive 140. In addition, the corresponding MD5 signature and rolling CRC checksum are added to the database, e.g., the archive map 142. The verification value and the checksum may be stored in the same database or separate databases. The method 200 proceeds to step 236 where the sequence file 144 is updated with the archive location of the stored block of data.

At step 238, the method 200 determines if the moved place marker has been set. If so, then the process continues to step 240, where the rolling CRC checksum and MD5 signature for the sub-block of data located between the moved place marker and current position are calculated. The method 200 then proceeds to step 226 where the sub-block block is written to the archive 140 (as described above). If the moved marker has not been set, the method 200 continues to step 242 and moves forward one block length to select a new original block of data from the original image file 158. The method 200 then advances to step 210.

If the CRC checksum has a match in the archive map 142 at step 214, this would indicate that a possible duplicate of the block has been found in the archive. However, since the 32-bit CRC checksum is not completely reliable (i.e., false positives may occur), a more accurate test using an MD5 algorithm is required. Thus, the method 200 continues to step 230 where a MD5 signature is calculated for the block of data in question. After the MD5 signature is calculated, the process proceeds to step 232 where a query is made whether the signature is already stored in the archive map 142. If the signature is already stored in the map 142 (i.e., a duplicate block exists), the method advances to step 234 where the reference count number is incremented by one in the archive map 142. At step 236, the sequence file is then updated with this blocks location information. If the MD5 signature is absent from the map 142, then the CRC checksum indicated a false duplicate and the process continues to step 218 (as described above).

The foregoing method ensures that insertions and deletions between different versions of a file are detected and updated in the archive. As such, the method provides substantial file storage savings for archiving backup files.

The present invention provides a method and apparatus capable of distinguishing and eliminating redundant data where changes between different versions of a file are detectable with the precision of a single byte. More specifically, the identification of minute insertions and deletions between different versions of files can be readily achieved with this invention. The changes in a file caused by the insertions and deletions are archived without archiving a duplicate of the unchanged portions of a file. Consequently, the present invention fulfills the need in the art for a more efficient method of eliminating redundant data in backup servers.

While the foregoing is directed to one embodiment of the present invention, other and further embodiments of the invention may be devised without departing from the basic scope thereof, and the scope thereof is determined by the claims that follow.

What is claimed is:

1. A method comprising:
   determining whether a checksum for a current block is present in a database,
      wherein
      a file comprises the current block; and
   in response to determining that the checksum is present in the database,
      calculating a verification value for the current block,
      determining whether the verification value for the current block is present in the database,
      if the verification value for the current block is present in the database, identifying the current block as a redundant block of data, and
      otherwise,
         forming a new block of data, wherein
            the forming the new block of data comprises merging at least a portion of the current block and an additional portion of data, wherein
               the additional portion of data comprises data within the file, and
         determining whether the new block of data is a redundant block of data, wherein
            the determining whether the new block of data is a redundant block of data comprises
               determining whether a checksum for the new block of data is present in the database, and
               in response to the checksum for the new block of data being present in the database, determining whether a verification value for the new block of data is present in the database.

2. The method of claim 1, further comprising:
   defining a block of data as the current block.

3. The method of claim 1, further comprising:
   calculating the checksum for the current block, wherein
      the checksum is calculated using a rolling error identification code.

4. The method of claim 1, wherein the verification value is calculated from a message digest algorithm.

5. The method of claim 1, wherein the verification value comprises at least one of a MD4, MD5, and SHA-1 signature.

6. The method of claim 1, further comprising:
in response to determining that the current block is a redundant block of data, causing database information to be updated to indicate that the current block is a redundant block of data.

7. The method of claim 6, further comprising:
selecting a next consecutive block of data,
defining the next consecutive block of data as the current block, and
after the defining, repeating, for the current block, the determining whether the checksum for the current block is present in the database, the calculating the verification value for the current block, and the determining whether the verification value for the current block is present in the database.

8. The method of claim 1, wherein the merging comprises:
dropping a last portion of the current block, and
forming the new block of data by adding the additional portion of data to the beginning of the current block.

9. The method of claim 1, wherein the determining whether the new block of data is a redundant block of data further comprises:
calculating the checksum for the new block of data, and
calculating the verification value for the new block of data.

10. A non-transitory computer readable storage medium comprising program instructions executable to:
determine whether a checksum for a current block is present in a database,
wherein
a file comprises the current block; and
if the checksum is present in the database,
calculate a verification value for the current block,
determine whether the verification value for the current block is present in the database,
if the verification value for the current block is present in the database, identify the current block as a redundant block of data, and
otherwise,
form a new block of data, wherein
the instructions that are executable to form the new block of data are further executable to merge at least a portion of the current block and an additional portion of data, wherein
the additional portion of data comprises data within the file, and
determine whether the new block of data is a redundant block of data, wherein
the instructions that are executable to determine whether the new block of data is a redundant block of data are further executable to
determine whether a checksum for the new block of data is present in the database, and
determine whether a verification value for the new block of data is present in the database, in response to the checksum for the new block of data being present in the database.

11. The non-transitory computer readable storage medium of claim 10, wherein the program instructions are further executable to:
cause database information to be updated to indicate that the current block is a redundant block of data, in response to a determination that the current block is a redundant block of data.

12. The non-transitory computer readable storage medium of claim 11, wherein the program instructions are further executable to:
select a next consecutive block of data,
define the next consecutive block of data as the current block, and
after the define, repeat, for the current block, the determine whether the checksum for the current block is present in the database, the calculate the verification value for the current block, and the determine whether the verification value for the current block is present in the database.

13. The non-transitory computer readable storage medium of claim 10, wherein the program instructions that are executable to merge are further executable to:
drop a last portion of the current block, and
form the new block of data by adding the additional portion of data to the beginning of the current block.

14. The non-transitory computer readable storage medium of claim 10, wherein the program instructions that are executable to determine whether the new block of data is a redundant block of data are further executable to:
calculate the checksum for the new block of data, and
calculate the verification value for the new block of data.

15. A system comprising:
a processor; and
memory coupled to the processor, wherein the memory stores program instructions executable by the processor to:
determine whether a checksum for a current block is present in a database,
wherein
a file comprises the current block; and
in response to determining that the checksum is present in the database,
calculate a verification value for the current block,
determine whether the verification value for the current block is present in the database,
if the verification value for the current block is present in the database, identify the current block as a redundant block of data, and
otherwise,
form a new block of data, wherein
the program instructions that are executable to form the new block of data are further executable to merge at least a portion of the current block and an additional portion of data, wherein
the additional portion of data comprises data within the file, and
determine whether the new block of data is a redundant block of data, wherein
the program instructions that are executable to determine whether the new block of data is a redundant block of data are further executable to
determine whether a checksum for the new block of data is present in the database, and
determine whether a verification value for the new block of data is present in the database, in response to the checksum for the new block of data being present in the database.

16. The system of claim 15, wherein the program instructions that are executable to merge are further executable to:
drop a last portion of the current block, and
form the new block of data by adding the additional portion of data to the beginning of the current block.

17. The system of claim 15, wherein the program instructions that are executable to determine whether the new block of data is a redundant block of data are further executable to:
  calculate the checksum for the new block of data, and
  calculate the verification value for the new block of data.

18. The method of claim 1, wherein the determining whether the new block of data is a redundant block of data further comprises:
  identifying a new beginning position for the new block of data, and
  using the new beginning position for the new block of data to determine whether the new block of data is a redundant block of data.

19. The non-transitory computer readable storage medium of claim 10, wherein the program instructions that are executable to determine whether the new block of data is a redundant block of data are further executable to:
  identify a new beginning position for the new block of data, and
  use the new beginning position for the new block of data to determine whether the new block of data is a redundant block of data.

20. The system of claim 15, wherein the program instructions that are executable to determine whether the new block of data is a redundant block of data are further executable to:
  identify a new beginning position for the new block of data, and
  use the new beginning position for the new block of data to determine whether the new block of data is a redundant block of data.

* * * * *